United States Patent
Tinnakornsrisuphap et al.

(10) Patent No.: US 9,232,448 B2
(45) Date of Patent: Jan. 5, 2016

(54) METHODS AND APPARATUS FOR NEIGHBOR DISCOVERY OF BASE STATIONS IN A COMMUNICATION SYSTEM

(75) Inventors: Peerapol Tinnakornsrisuphap, San Diego, CA (US); Rajat Prakash, La Jolla, CA (US); Fatih Ulupinar, San Diego, CA (US); David Ott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1678 days.

(21) Appl. No.: 12/136,495

(22) Filed: Jun. 10, 2008

(65) Prior Publication Data

US 2008/0311914 A1    Dec. 18, 2008

Related U.S. Application Data

(60) Provisional application No. 60/944,711, filed on Jun. 18, 2007.

(51) Int. Cl.
| | |
|---|---|
| *H04W 4/00* | (2009.01) |
| *H04W 36/00* | (2009.01) |
| *H04W 8/00* | (2009.01) |
| *H04W 92/20* | (2009.01) |

(52) U.S. Cl.
CPC .......... *H04W 36/0083* (2013.01); *H04W 8/005* (2013.01); *H04W 92/20* (2013.01)

(58) Field of Classification Search
CPC . H04W 36/0083; H04W 80/04; H04W 88/06; H04W 84/18
USPC ........ 370/328, 310.2, 331, 60; 455/33.2, 436, 455/442
See application file for complete search history.

(56) References Cited

U.S. PATENT DOCUMENTS

| | | |
|---|---|---|
| 7,162,247 B2 | 1/2007 | Baba et al. |
| 2005/0282547 A1 | 12/2005 | Kim et al. |

(Continued)

FOREIGN PATENT DOCUMENTS

| | | |
|---|---|---|
| EA | 200601344 A1 | 2/2007 |
| EP | 1124400 | 8/2001 |

(Continued)

OTHER PUBLICATIONS

3GPP TS 36.300, "Evolved Universal Terrestrial Radio Access (E-UTRA) and Evolved Universal Terrestrial Radio Access Network (E-UTRAN); Overall description; Stage 2 (Release 8)", V8.0.0, Mar. 2007.

(Continued)

*Primary Examiner* — Hassan Kizou
*Assistant Examiner* — Abdelnabi Musa

(57) ABSTRACT

An automated neighbor discovery by a base station with the assistance of an access terminal are disclosed. An exemplary method includes receiving a first message from an access terminal based on detecting an identification signal by the access terminal from the first base station in a communication system. Determination whether the first base station is a known base station is then made. If the first base station is not known, a second message is transmitted to the access terminal requesting a network identification of the first base station. A third message from the access terminal is received in response to the second message including the requested network identification. A request for identification data is sent by the second base station to the first base station via a network link based on the network identification. Corresponding apparatus and other exemplary methods are also disclosed.

42 Claims, 10 Drawing Sheets

(56) References Cited

U.S. PATENT DOCUMENTS

| | | | |
|---|---|---|---|
| 2006/0056351 A1* | 3/2006 | Wall | 370/331 |
| 2006/0084470 A1* | 4/2006 | Hashimoto et al. | 455/552.1 |
| 2006/0084479 A1 | 4/2006 | Kim et al. | |
| 2006/0121935 A1 | 6/2006 | Dalsgaard et al. | |
| 2007/0010250 A1 | 1/2007 | Bosch et al. | |
| 2007/0099649 A1* | 5/2007 | Han et al. | 455/525 |
| 2007/0104176 A1* | 5/2007 | Ji et al. | 370/348 |
| 2007/0147283 A1* | 6/2007 | Laroia et al. | 370/328 |
| 2008/0043665 A1* | 2/2008 | Jeon et al. | 370/328 |
| 2008/0268852 A1* | 10/2008 | Petrovic et al. | 455/442 |
| 2009/0135758 A1* | 5/2009 | Alper et al. | 370/328 |
| 2010/0113063 A1* | 5/2010 | Han et al. | 455/456.1 |
| 2012/0289234 A1* | 11/2012 | Heller et al. | 455/436 |

FOREIGN PATENT DOCUMENTS

| | | |
|---|---|---|
| RU | 2006106706 | 9/2006 |
| WO | 2005025091 A1 | 3/2005 |
| WO | 2007036764 A1 | 4/2007 |

OTHER PUBLICATIONS

International Search Report—PCT/US08/067224—International Search Authority, European Patent Office—Oct. 9, 2008.
Written Opinion—PCT/US08/067224—International Search Authority, European Patent Office—Oct. 9, 2008.
Ericsson: "Discussion on Automatic Neighbour Relation Lists for LTE." 3GPP TSG-SA5 (Telecom Management). Meeting SA5#53, S5-070974, May 7, 2007, pp. 1-5.
"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.0.0 Release 8); ETSI TS 136 300." ETSI Standards, LIS, Sophia Antipolis Cedex, France, vol. 3-R2, No. v8.0.0, Mar. 1, 2007.
Dorot, V., et al., "An Explanatory Dictionary of Modern Computer Terms," 2nd Edition, bhv, Saint Petersburg, 2001, 'Program Product' on p. 339.
Taiwan Search Report—TW097122740—TIPO—Dec. 16, 2011.

* cited by examiner

METHODS AND APPARATUS FOR NEIGHBOR DISCOVERY OF BASE STATIONS IN A COMMUNICATION SYSTEM

CLAIM OF PRIORITY UNDER 35 U.S.C. §119

The present Application for patent claims priority to Provisional Application No. 60/944,711 entitled "NEIGHBOR DISCOVERY OF BASE STATIONS IN A COMMUNICATION NETWORK" filed Jun. 18, 2007, and assigned to the assignee hereof and hereby expressly incorporated by reference herein.

BACKGROUND

1. Field

The present disclosure generally relates to methods and apparatus for neighbor discovery of base stations in a communication system, and more particularly to an automated neighbor discovery by a base station with the assistance of an access terminal.

2. Background

In communication systems, such as wireless communication systems, base stations serving communication content may maintain data concerning neighboring base stations within the communication system. Neighboring base stations are those base stations geographically situated relative to a particular base station that represent viable candidates to which to a mobile communication device being currently served by the particular base station might handed off to as the mobile communication changes location.

In certain wireless communication systems, such those employing Ultra Mobile Broadband (UMB) technology or LTE (Long Term Evolution technology) having an Evolved Packet System (EPS), the communication network linking the base stations may be used by the base stations to communicate respective information to other base stations in the network (e.g., evolved base stations (eBS) in a converged access network, such as a radio area network (RAN), connected via an access gateway (AGW)). Additionally in such systems, when an access terminal (AT) undergoes a handoff from one base station to another, the AT will report neighboring base station information (e.g., a Pilot ID) at the time of handoff, which saves overhead resources. Normally if the network neighboring base station is known to the base station handing off, the identifying information is sufficient for handing off within the network. However, whenever a new base station is added or removed from the RAN, these conventional systems require an operator to manually reconfigure all of the affected base stations, which becomes particularly burdensome, making acquisition expensive, and is less homogeneous, especially if temporary base stations are used within a network.

SUMMARY

According to an aspect, a method of discovering a first base station by a second base station in a communication system is disclosed. The method includes receiving a first message from an access terminal to assist the access terminal to handoff from the second base station to the first base station based on detecting of an identification signal by the access terminal from the first base station in the communication system. The method further includes determining whether the first base station is a known base station based on the identification signal, and transmitting a second message to the access terminal requesting a network identification of the first base station when a determination is made that the first base station is not a known base station. The method also includes receiving a third message from the access terminal in response to the second message including the network identification of the first base station, and sending a request for identification data to the first base station based on the network identification.

According to another aspect, an apparatus for use in discovering a base station in a communication network is disclosed. The apparatus includes a transceiver circuit configured to receive a first message from an access terminal to assist the access terminal to handoff to a first base station from a second base station based on detecting of an identification signal by the access terminal from the first base station in the communication system. The apparatus also includes a neighbor discovery module configured to determine whether the first base station is a known base station based on the identification signal; wherein the transceiver circuit is further configured to transmit a second message to the access terminal requesting a network identification of the first base station when a determination is made by the neighbor discovery module that the first base station is not a known base station; and receive a third message from the access terminal in response to the second message including the network identification of the first base station; and a network interface circuit configured to send a request for identification data to the first base station via a network link based on the network identification.

According to a further aspect, an apparatus for use in a communication system is disclosed that includes: means for receiving a first message from an access terminal to assist the access terminal to handoff to a first base station from a second base station based on detecting of an identification signal by the access terminal from the first base station in the communication network. The apparatus also includes means for determining whether the first base station is a known base station based on the identification signal, and means for transmitting a second message to the access terminal requesting a network identification of the first base station when a determination is made that the first base station is not a known base station. Additionally the apparatus includes means for receiving a third message from the access terminal in response to the second message including the network identification of the first base station, and means for sending a request for identification data to the first base station based on the network identification.

According to yet another aspect, a computer program product comprising: computer-readable medium is disclosed. The medium includes code for causing a computer to receive a first message from an access terminal to assist the access terminal to handoff to a first base station from a second base station based on detecting of an identification signal by the access terminal from the first base station in the communication system. The medium also includes code for causing a computer to determine whether the first base station is a known base station based on the identification signal, and code for causing a computer to transmit a second message to the access terminal requesting a network identification of the first base station when a determination is made that the first base station is not a known base station. The medium further includes code for causing a computer to receive a third message from the access terminal in response to the second message including the network identification of the first base station, and code for causing a computer to send a request for identification data to the first base station based on the network identification.

According to yet a further aspect, a method of discovering a base station in a communication system is disclosed. The method includes detecting an identification signal from a first base station in the communication network at an access terminal, and transmitting a request to a second base station to assist the access terminal to hand off to the first base station based on the identification signal. The method further includes receiving a message from the second base station when the second base station determines that the first base station is not a known base station to request identification data of the first base station, obtaining the identification data from the first base station, and transmitting the identification data to the second base station.

According to still another aspect, an apparatus in an access terminal for use in neighbor discovery of a base station in a communication system is disclosed. The apparatus includes a transceiver circuit configured to detect an identification signal from a first base station in the communication network at an access terminal, to transmit a request to a second base station to assist the access terminal to hand off to the first base station based on the identification signal, and to receive a message from the second base station when the second base station determines that the first base station is not a known base station to request identification data of the first base station. The apparatus also includes a neighbor discovery module configured to obtain the identification data from the first base station; and direct the transceiver circuit to transmit the identification data to the second base station.

According to another aspect, an apparatus in an access terminal for use in neighbor discovery of a base station in a communication system is disclosed. The apparatus includes means for detecting an identification signal from a first base station in the communication network at an access terminal, and means for transmitting a request to a second base station to assist the access terminal to hand off to the first base station based on the identification signal. The apparatus also includes means for receiving a message from the second base station when the second base station determines that the first base station is not a known base station to request identification data of the first base station, means for obtaining the identification data from the first base station, and means for transmitting the identification data to the second base station.

According to yet one more aspect, a computer program product comprising: computer-readable medium is disclosed. The medium includes code for causing a computer to detect an identification signal from a first base station in the communication network at an access terminal, code for causing a computer to transmit a request to a second base station to assist the access terminal to hand off to the first base station based on the identification signal, and code for causing a computer to receive a message from the second base station when the second base station determines that the first base station is not a known base station to request identification data of the first base station. The medium further includes code for causing a computer to obtain the identification data from the first base station, and code for causing a computer to transmit the identification data to the second base station.

DETAILED DESCRIPTION

The presently disclosed method and apparatus effect neighbor discovery (ND) of base stations in a communication system, and more particularly automatic neighbor discovery by a base station with the assistance of an access terminal. That is, an access terminal detecting wirelessly broadcast identification information from a base station, may communicate that information to other base stations to assist the base station in ND. Once ND is performed, the base stations may update the network of base stations (e.g., a RAN) such that information is exchanged between neighboring base stations via any one or a number of means, such as a gateway/network, to achieve full operational capability. By utilizing identifying information already normally detected by an access terminal and reported to a base station during handoffs (e.g., Pilot ID), manual configuration of newly added (or dropped) base stations may be eliminated.

In the following described examples, for reasons of conciseness and clarity the disclosure uses terminology associated with Ultra Mobile Broadband (UMB) technology. It should be emphasized, however, that the presently described examples are also applicable to other technologies, such as technologies related to Code Division Multiple Access (CDMA), Time Division Multiple Access (TDMA), Frequency Division Multiple Access (FDMA), Orthogonal Frequency Division Multiple Access (OFDMA) and so forth. It will be appreciated by those skilled in the art, that when applying the disclosed methods and apparatus to other technologies, the associated terminology would clearly be different.

Figure 1:
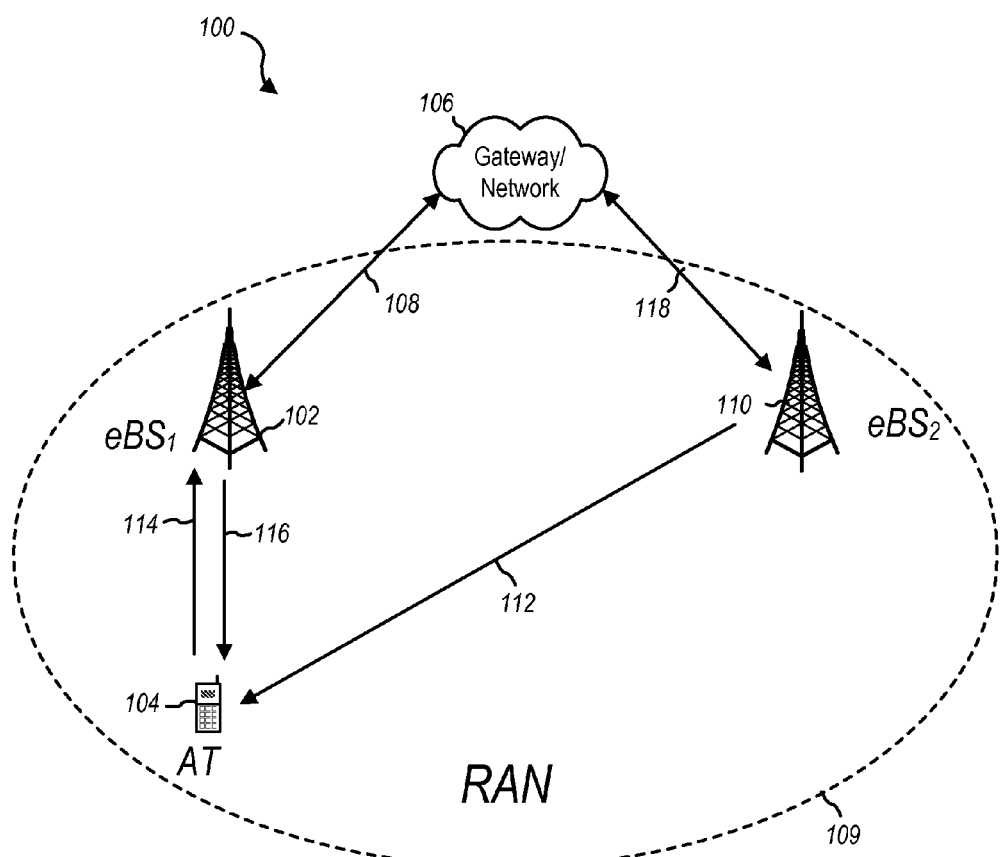
FIG. 1 is a communication system employing methods and apparatus for neighbor base station discovery.

Turning to FIG. 1, this diagram illustrates a communication system 100 in which the presently disclosed methods and apparatus may be utilized. As shown, the communication system 100 includes at least one base station 102 or similar apparatus that functions to serve communications to one or more mobile devices, such as an access terminal 104 (AT). In this particular example using the nomenclature of UMB, base station 102 is an evolved base station (eBS) given the designation of $eBS_1$.

Each base station in the communication system 100 is in communication with a Gateway/Network 106. Again using the nomenclature of UMB, the Gateway/Network 106 may be comprised of an Access Gateway (AGW), in connection with a wide area network, such as the internet. The coupling of the Gateway/Network 106 to base stations (eBS's), such as coupling 108 affords extension of Internet Protocol (IP) to each eBS in the communication system 100, which also enables faster switching of an AT between base stations in the system 100. The entirety of eBS's in communication with the Gateway/Network 106 effect a converged access network or radio access network (RAN) 109.

Each base station in the communication system 100 periodically transmits respective contact or identification information on overhead channels. Examples of the type of information contained in the identification information using UMB nomenclature includes network identification information (e.g., an ANID, which may contain an IP address, a mechanism to map the network identification information to the IP address, or Sector ID), as well as a pilotID. Accordingly, when an AT such as AT 104 first detects a pilot channel, and more particularly a pilotID, from another neighboring eBS, such as $eBS_2$ 110 in FIG. 1, the network ID information of the second base station $eBS_2$ needs to be known by the currently serving base station $eBS_1$ to assist the AT 104 in handoff from $eBS_1$ to $eBS_2$.

If the network information of a neighboring base station is not known to the currently serving base station, configuration of the base stations with identifying information is required to provide full communication system functionalities (e.g., paging and data tunneling). Examples of such identifying information may typically include the IP address of the base station, geographical location, paging related information, topological and routing information, and a protocol interface version. In the system of FIG. 1, each base station may be configured to utilize the AT wireless communication and the attendant information transmitted wirelessly thereto by other base stations to automatically add or delete (in the case where a base station goes out-of-service) a base station from a neighbor list maintained by the base stations.

In one aspect of an automated neighbor discovery (ND), an AT 104 in the communication system 100, which is currently being served by a base station $eBS_1$, detects a signal including identification data (e.g., a pilotID, as well as ANID or Sector ID) 112 from a neighboring base station 110. For certain operations, such as a handoff of the AT 104 from one eBS (i.e., the serving eBS 102) to another (e.g., eBS 110 called the "target" eBS), as mentioned before, it is desirable for all the BSs to having information regarding each other's operating parameters and capabilities.

Accordingly, AT 104 may then communicate or report the detected identification data from the transmitted identifying data 112 to the currently serving base station 102 as illustrated by communication link 114. If the base station 102 does not recognize the base station 110, base station 102 requests the AT 104 for the network identification information (e.g., ANID or Sector ID) concerning the unknown base station (110 in this example) as illustrated by communication link 116. At this point, the AT 104 may then respond to the request from $eBS_1$ 102 with the ANID or Sector ID information.

Once $eBS_1$ has the Sector ID information about the new base station $eBS_2$ 110, a query for one or more requested data may be issued by $eBS_1$ to the address of $eBS_2$ via the gateway/network 106 (and communication links 108, 118) as an example. The new base station $eBS_2$ transmits the requested information to $eBS_1$ via the gateway/network 106, with which $eBS_1$ 102 updates its neighbor list or similar data structure for keeping track of potentially viable target neighboring base stations. According to another aspect, the new base station $eBS_2$ may also initiate neighbor discovery requests to base station $eBS_1$ via the gateway/network 106. It is noted here that the query for the one or more requested data via the gateway/network 106 is merely exemplary and not limited to such, and that this information may be exchanged through any number of various means including wireless links using the Sector ID address information.

Figure 2:
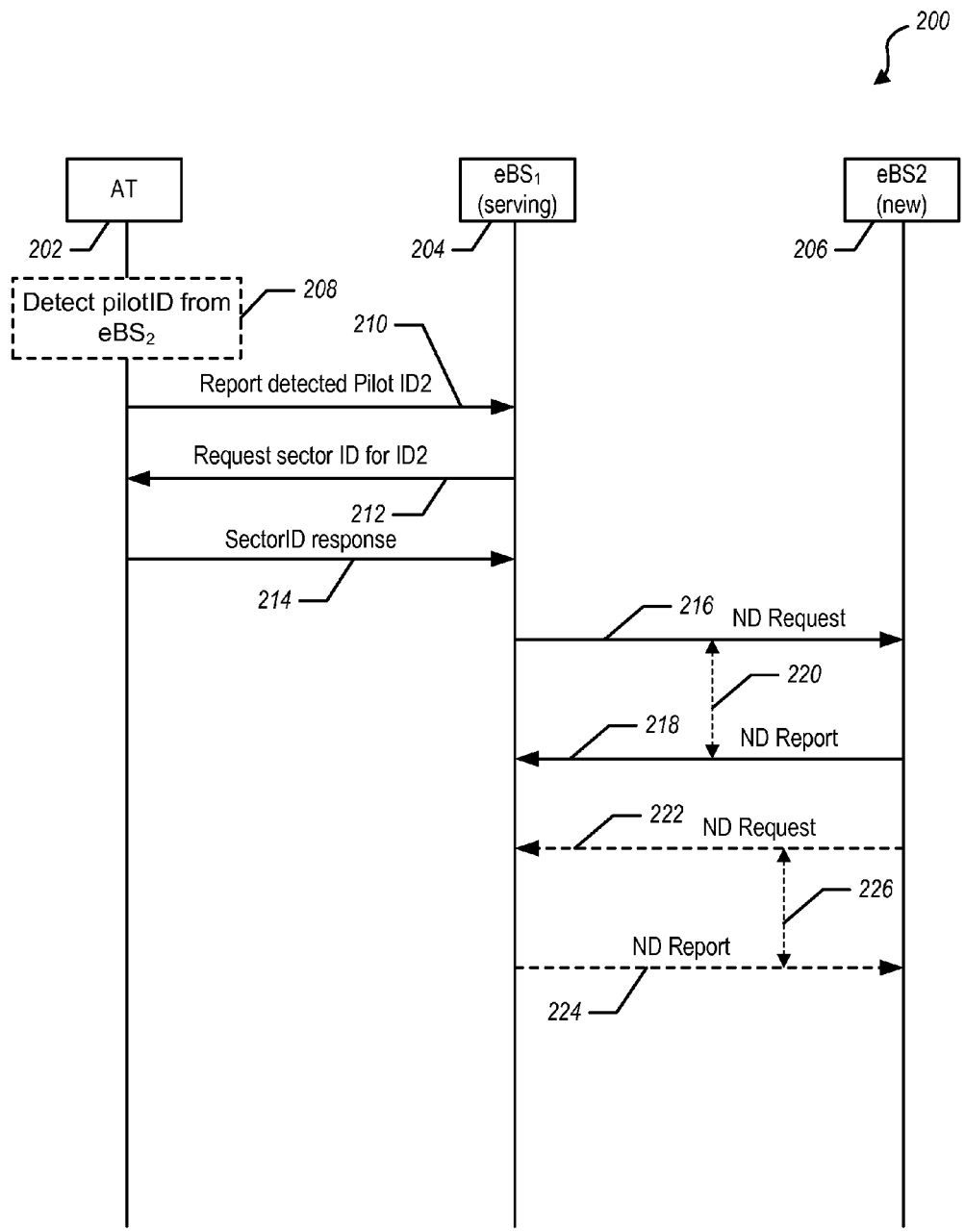
FIG. 2 is a call flow diagram of an exemplary method for discovering a neighboring base station to a communication system.

FIG. 2 illustrates a call flow diagram of a process for neighbor discovery that may be used in the communication system of FIG. 1. As shown the call flows illustrated occur between an access terminal AT 202, a first serving base station $eBS_1$ 204, and a target base station $eBS_2$ 206. It is noted that the vertical direction of the call flow 200 represents time or sequential ordering of the messages between the various devices.

The AT 202 may detect or senses a pilot from another base station $eBS_2$ 206 besides the currently serving base station $eBS_1$ 204 as illustrated by block 208. When the AT 202 detects the pilotID from the pilot of $eBS_2$ 206 (referred to hereinafter as Pilot ID2 in this example), AT 202 reports the Pilot ID2 to the currently serving $eBS_1$ 204 as indicated by message 210. If $eBS_1$ 204 does not recognize $eBS_2$ 206 based on the Pilot ID2 (which may occur when $eBS_2$ has been newly added to the network, as an example), $eBS_1$ responds with a request message to AT 202 for the Sector ID associated with Pilot ID2 as illustrated by message 212. In response to the request 212, AT 202 then sends a response 214 to $eBS_1$ 204 with the Sector ID of pilotID2, as obtained wirelessly from the pilot transmitted by $eBS_2$ 206.

Once the base station $eBS_1$ 204 has the Sector ID information for $eBS_2$ 206, the $eBS_1$ sends a neighbor discovery (ND) request 216 to $eBS_2$ 206 to initiate neighbor discovery procedures (e.g., obtaining protocol revision, supported AGW addresses, location, zone information, etc.). In particular, $eBS_1$ 204 may send the request 216 to $eBS_2$ 206 via an AGW or other suitable gateway/network, such as 106 in FIG. 1. In response, the $eBS_2$ 206 may send a neighbor discovery report message 218 to requesting base station $eBS_1$ 206. Additionally, the request 216 may include the pilot ID (i.e., pilotID1) associated with $eBS_1$, wherein $eBS_2$ associates $eBS_1$ with pilotID1. A prescribed time period 220 measured by a timer at $eBS_1$ may also be employed to ensure that the request is answered within a certain timing. The timer is stopped by receipt of a report message 218 transmitted from $eBS_2$ to $eBS_1$. When report message is received, $eBS_1$ 204 associates $eBS_2$ with pilotID2 and stores the ND information of $eBS_2$ (as well as stopping the timer, if used).

As a further alternative, the new base station $eBS_2$ 206 may send a message 222 requesting ND information from $eBS_1$ 204 similar to message 216 sent by $eBS_1$ 204. IN response, $eBS_1$ 204 issues a message 224 to report its ND information to $eBS_2$ 206. Additionally, $eBS_2$ 206 may employ a timer to measure a prescribed time period 226. Thus, when $eBS_2$ 206 sends message 222, the timer is started and is subsequently stopped upon receipt of message 224.

Figure 3:
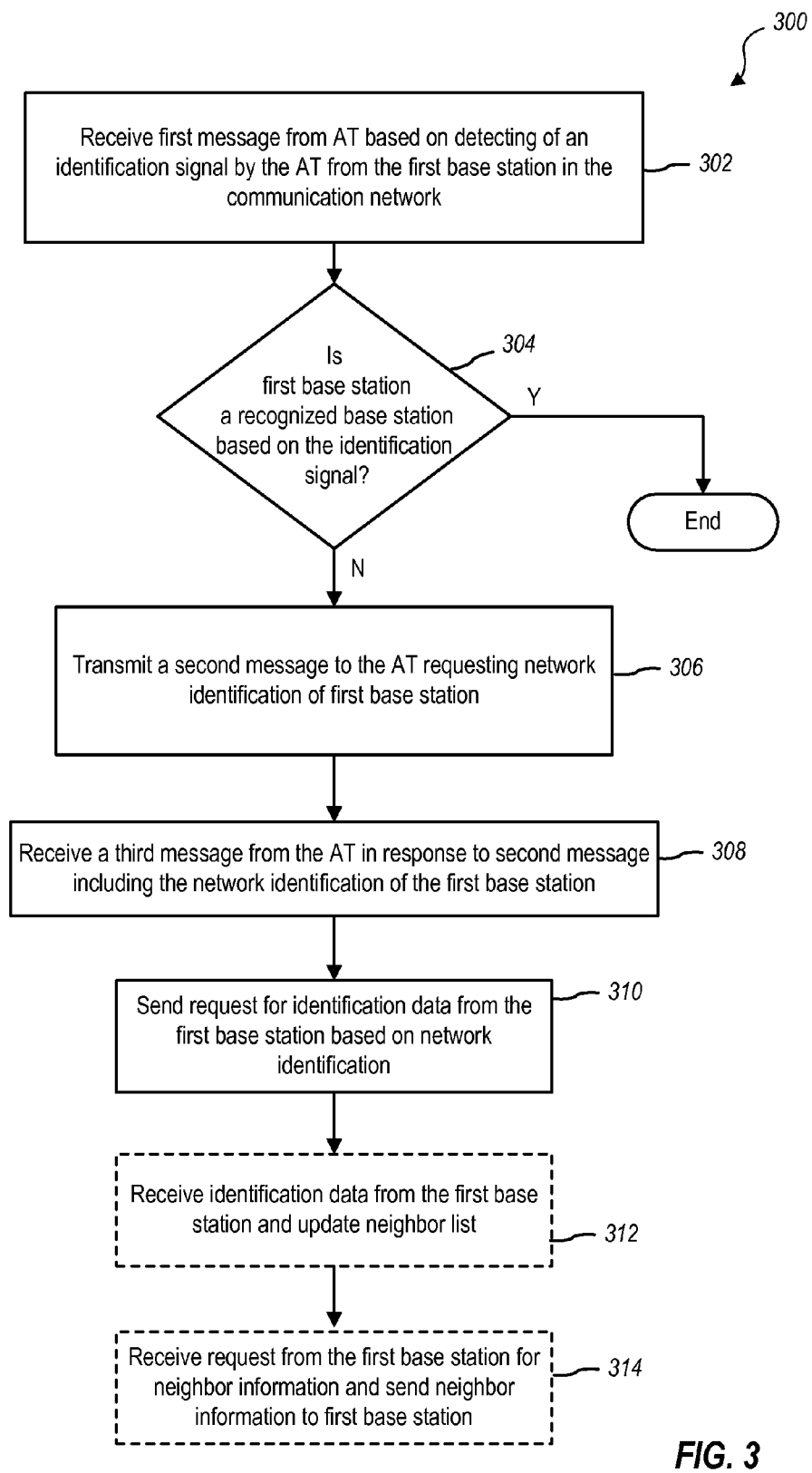
FIG. 3 is a flow diagram of an exemplary method for discovering a neighboring base station in a communication system.

FIG. 3 illustrates a flow diagram of a method for neighbor discovery that may be used with the system of FIG. 1. In particular, the method 300 may be implemented in a base station, such as $eBS_1$ or $eBS_2$ as illustrated by FIGS. 1 and 2. As shown, after initialization the method 300 includes a block 302 where the base station (e.g., $eBS_1$) receives a first message from an AT based on detecting of an identification signal by the access terminal from a first base station (e.g., $eBS_2$) in the communication network. This process is akin to message 210 in FIG. 2, where the identification signal is the pilotID. It is noted that the process of block 302 may be initiated by the request from the AT, such as in situations where the AT is seeking assistance to determine a viable target base station to which to hand off.

After block 302, flow proceeds to decision block 304 where a determination is made whether the first base station is a recognized base station based on the identification signal (e.g., pilotID). This check may be accomplished by searching a neighbor table stored at the base station to determine if the pilotID is known. If the base station recognizes the pilotID, no further neighbor discovery need be performed at this point and the process 300 may terminate. Alternatively, if the base station's pilotID is not known, then flow proceeds to block 306. At block 306, a second message is sent by the base station to the AT requesting a network identification, which may be garnered by the AT from pilot of the other base station. This second message of block 306 is akin to message 212 in FIG. 2, as an example, where the network identification (e.g., the SectorID or ANID) is requested.

After block 306, flow proceeds to block 308 where the base station, in response to the request of block 306, receives a third message from the AT including network identification for the first base station. It is noted that the third message in the process of block 308 is akin to message 214 illustrated in FIG. 2, as an example, and the network identification may be the SectorID or ANID. After receipt the network identification, the base station sends a request to the first base station for identification data particular to the first base station based on the network identification as illustrated by block 310. It is noted that the process of sending the request in block 310 based on the network identification may include, in sending the request based on the network identification, first resolving or deriving an IP address of first base station using the network identification of the first base station. It is further noted that the request may be sent over a network, such as gateway/network 106 as illustrated in FIG. 1 rather than over wireless resources, but is not limited thereto and may include various means including wireless resources. An example of the request in block 310 is the ND request 216 in FIG. 2. Additionally, the requested identification data concerning the first base station may typically include, but is not limited to, the geographical location of the first base station, paging related information, topological and routing information, and a protocol interface version.

After the request in block 310 is sent over the network, from the standpoint of the serving base station, the process 300 for initiating neighbor discovery (ND) can be characterized as completed. However, it is intuitive that receipt of the identification data from the first base station will complete the neighbor discovery process allowing the serving base station to assist the AT in handing off to the first base station. Accordingly, a further alternative block 312 (shown dashed) is illustrated in FIG. 3 indicating the receipt of the identification data back from the first base station and updating of the neighbor list at the serving base station. The process of block 312 is akin to the ND Report message 218 shown in FIG. 2.

As a yet further alternative, method 300 may also include receiving a request from the first base station for neighbor information (e.g., neighbor list) known to the apparatus executing method 300 (i.e., another base station). In turn, the apparatus sends the neighbor information to the requesting first base station as illustrated by dashed block 314. It is noted that the process of block 314 is akin to the function effected by messages 222 and 224 illustrated in FIG. 2.

Figure 4:
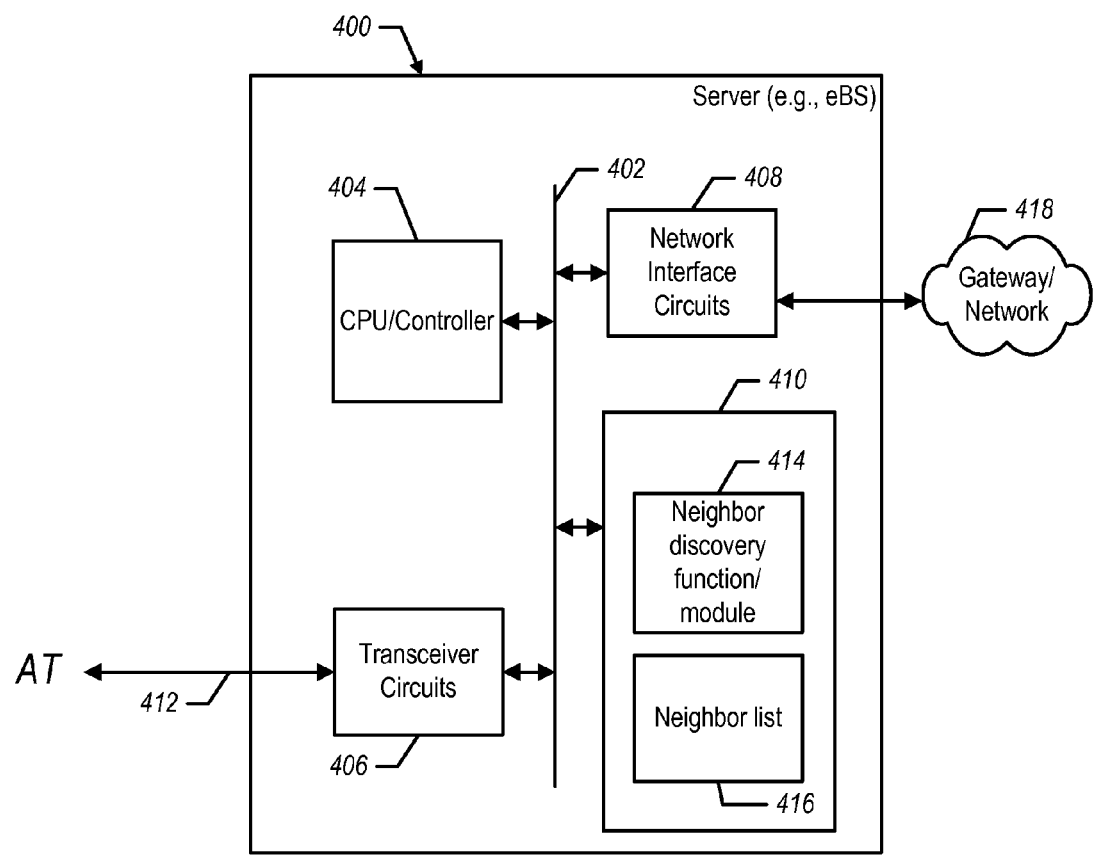
FIG. 4 is an exemplary implementation of an apparatus for discovering a neighboring base station in a communication system.

FIG. 4 schematically shows an exemplary implementation of an apparatus 400 for executing the methodologies as described above. Apparatus 400 may be implemented in a server implemented with an eBS, as merely an example, or any other suitable apparatus. The apparatus 400 features a central data bus 402, or similar device for linking several circuits together. The circuits include a CPU (Central Processing Unit) or a controller 404, transceiver circuits 406, network interface circuits 408, and a memory unit 410.

The transceiver circuits 406 include receiver circuits to process received signals before sending out to the central data bus 402, as well as transmit circuits to process and buffer data from the data bus 402 before sending out of the device 400, such as to an AT as illustrated. Additionally in the case where apparatus 400 is employed in a base station, the transceiver circuits 406 may include RF circuits to transmit over a wireless link 410 to one or more AT's.

The CPU/controller 404 performs the function of data management of the data bus 402 and further the function of general data processing, including executing the instructional contents of the memory unit 410. It is noted here that instead of separately implemented as shown in FIG. 4, as an alternative, the transceiver circuits 406 can be incorporated as parts of the CPU/controller 404. As a further alternative, the entire apparatus 400 may be implemented as an application specific integrated circuit (ASIC) or similar apparatus.

The memory unit 410 may include one or more sets of instructions/modules. In the exemplary apparatus 400, the instructions/modules include, among other things, a neighbor discovery (ND) function 414, which is configured to effect the methodologies described herein. Memory unit 410 may further include a neighbor list 416 or similar data construct that stores, among other things, the identification data of neighboring data or references other storage with the at least a portion of the identification data.

In the example of FIG. 4, the memory unit 410 may be a RAM (Random Access Memory) circuit. The exemplary portions, such as the function 414, are software routines, modules and/or data sets. The memory unit 410 can be tied to another memory circuit (not shown) which either can be of the volatile or nonvolatile type. As an alternative, the memory unit 410 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and other computer-readable media well known in the art.

It is further noted that the network interface circuits 408 may be used to effect neighbor discovery functions, such as communication with a gateway/network 418, which is similar to gateway/network 106. In particular, the circuits 408 may be used to transmit and receive messages for obtaining identification data from other apparatus in the communication network 418 for, among other things, neighbor discovery.

Figure 5:
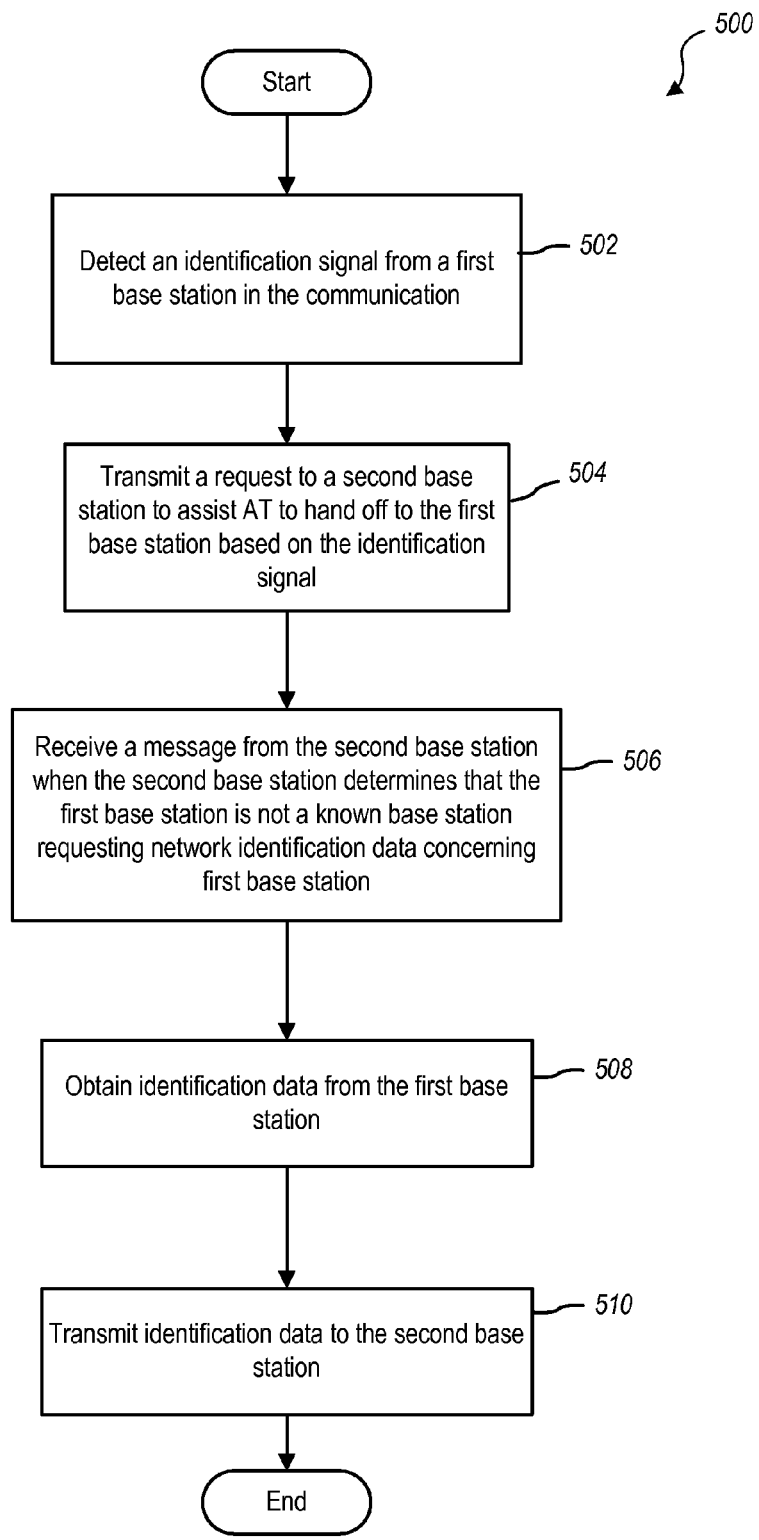
FIG. 5 is a flow diagram of an exemplary method that may be used in an access terminal or similar device for neighbor discovery of base stations in a communication system.

FIG. 5 illustrates a flow diagram of an exemplary methodology that may be effected by an AT or similar device for neighbor discovery of base stations in a network. As shown, the method 500 includes a block 502 where the AT detects an identification signal from a first base station in the communication. This detection may include detecting the pilot channel of the first base station, and the identification signal may include the pilotID of the first base station. An example of this detection is illustrated by block 208 in FIG. 2. After detection of the identification signal, the AT then transmits a request to a second base station to assist AT to hand off to the first base station based on the identification signal as illustrated by block 504. It is noted that this message request is akin to the report message 210 illustrated by FIG. 2.

After the message in block 504 is transmitted, the second base station will determine if the first base station is known in the communication network. If not, the second base station will transmit a message to the AT requesting network identification information concerning the first base station. Hence, from the standpoint of the AT, the AT receives the message from the second base station when the second base station determines that the first base station is not a known base station, where the message requests network identification data from the AT concerning first base station as illustrated by block 506. It is noted that the process of block 506 may be exemplified by the request 212 in FIG. 2, and the network identification data may include a SectorID or ANID for the first base station.

After the process of block 506, the method 500 proceeds to block 508 where the AT obtains the network identification data (e.g., the Sector ID). As explained earlier the pilot signal broadcast by the first base station (e.g., 112 in FIG. 1) will include this data. Thus, the AT then obtains the network identification data from the pilot signal, for example and then transmits the network identification data to the second base station as illustrated by block 510. The process of block 510 is akin to the SectorID response 214 shown in FIG. 2. The second base station may then utilize the network identification data to initiate ND procedures to register the first base station and add the first base station to its list of known neighbors as discussed previously with respect to FIGS. 2 and 3, for example.

Figure 6:
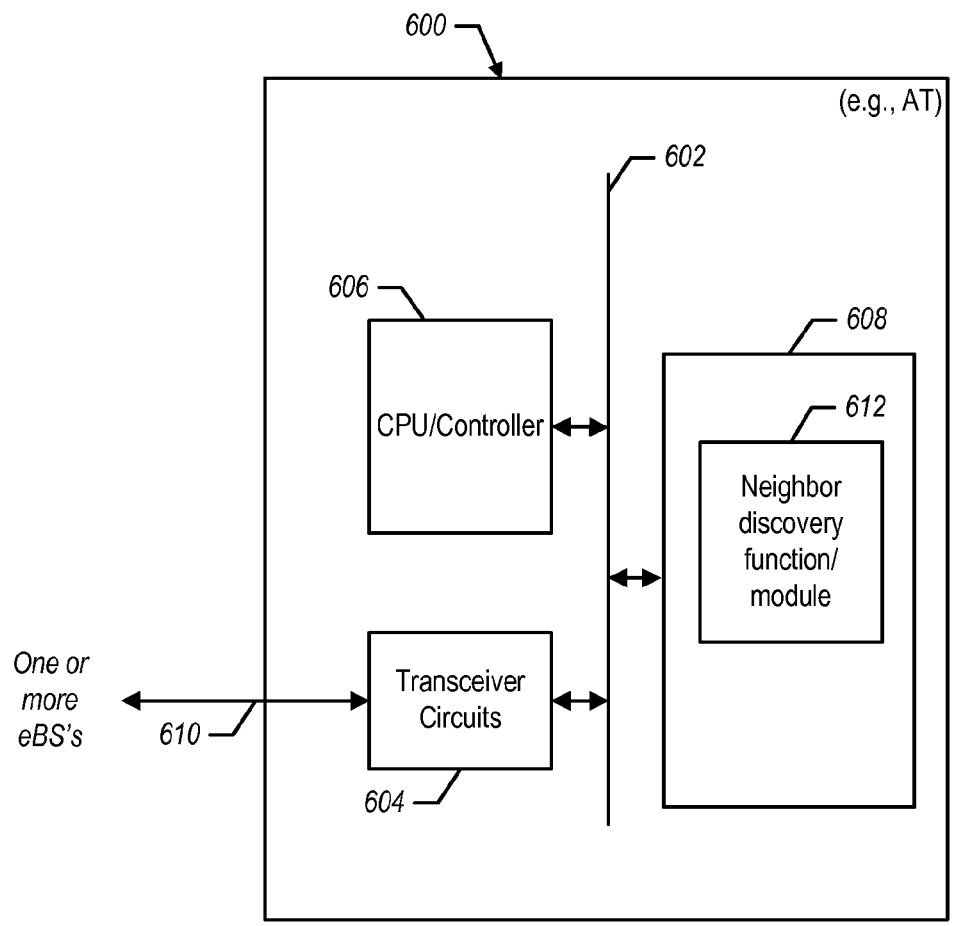
FIG. 6 is an exemplary apparatus that may be utilized in an access terminal or similar device for neighbor discovery of base stations in a communication system.

FIG. 6 illustrates an exemplary apparatus 600 that may be utilized to effect the methodology of FIG. 5. It is noted that apparatus 600 may constitute an AT or other suitable hardware (e.g., processor, or a collection of circuits/modules) for use in an AT device. As illustrated, the apparatus 600 includes a central data bus 602, or similar device for linking several circuits together. The circuits include a CPU (Central Processing Unit) or a controller 604, transceiver circuits 606, network, and a memory unit 608.

The transceiver circuits 606 include receiver circuits to process received signals before sending out to the central data bus 602, as well as transmit circuits to process and buffer data from the data bus 602 before sending out of the device 600, such as to one or more eBS's as illustrated by wireless communication link(s) 610. Accordingly, the transceiver circuits 606 may include RF circuits to transmit over the wireless link 610 to the one or more eBS's.

The CPU/controller 606 performs the function of data management of the data bus 602 and further the function of general data processing, including executing the instructional contents of the memory unit 410. It is noted here that instead of separately implemented as shown in FIG. 6, as an alternative, the transceiver circuits 606 can be incorporated as parts of the CPU/controller 604. As a further alternative, the entire apparatus 600 may be implemented as an application specific integrated circuit (ASIC) or similar apparatus. The memory unit 610 may include one or more sets of instructions/modules. In the exemplary apparatus 600, the instructions/modules include, among other things, a neighbor discovery (ND) function 612, which is configured to effect the methodologies described herein; namely FIG. 5.

In the example of FIG. 6, the memory unit 610 may be a RAM (Random Access Memory) circuit. The exemplary portions, such as the function 414, are software routines, modules and/or data sets. The memory unit 610 can be tied to another memory circuit (not shown) which either can be of the volatile or nonvolatile type. As an alternative, the memory unit 610 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and other computer-readable media well known in the art.

Figure 7:
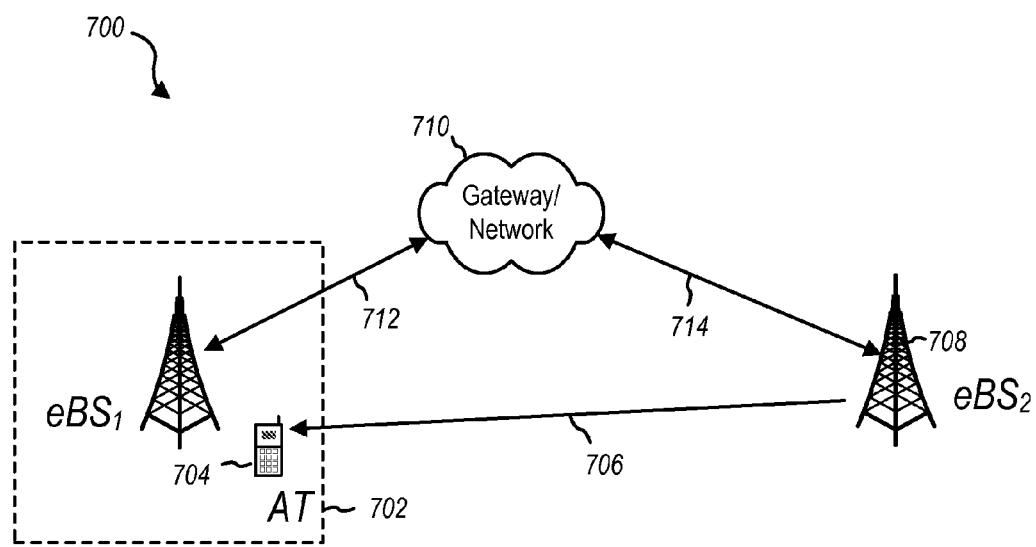
FIG. 7 is another example of a communication system utilizing neighbor base station discovery having an integrated base station and access terminal.

FIG. 7 illustrates another example of a communication system 700 utilizing neighbor discovery. In this example, it is contemplated that a base station (eBS) may include an integrated and dedicated AT unit used for ND procedures rather than an arbitrary AT currently being served by the base station. As may be seen in FIG. 7, base station eBS$_1$ 702 incorporates an AT 704. The AT 704 within the eBS$_1$ 702 detects or receives the pilot signal 706 from another neighboring base station (e.g., eBS$_2$ 708) in much the same way as the AT 104 discussed in connection with FIG. 1. It is noted, however, that the AT 704 must be within wireless reception range of another eBS (e.g., eBS$_2$ 708) in order to effectively accomplish ND procedures. After detection of a pilot signal, the interaction of the AT 704 with other elements of base station 702 is carried out in the same manner as discussed previously with respect to FIGS. 2, 4, and 5 to accomplish ND over the gateway/network 710 and accompanying links 712 and 714.

It is also noted that the eBS$_1$ and AT in the example of FIG. 7 may be implemented with apparatus similar to those described herein with respect to FIGS. 4 and 6. It is further noted that elements of the apparatus 400 and 600 may overlap and could be consolidated into a singular unit with modules or circuits configured to perform the methods of FIGS. 3 and 5.

Figure 8:
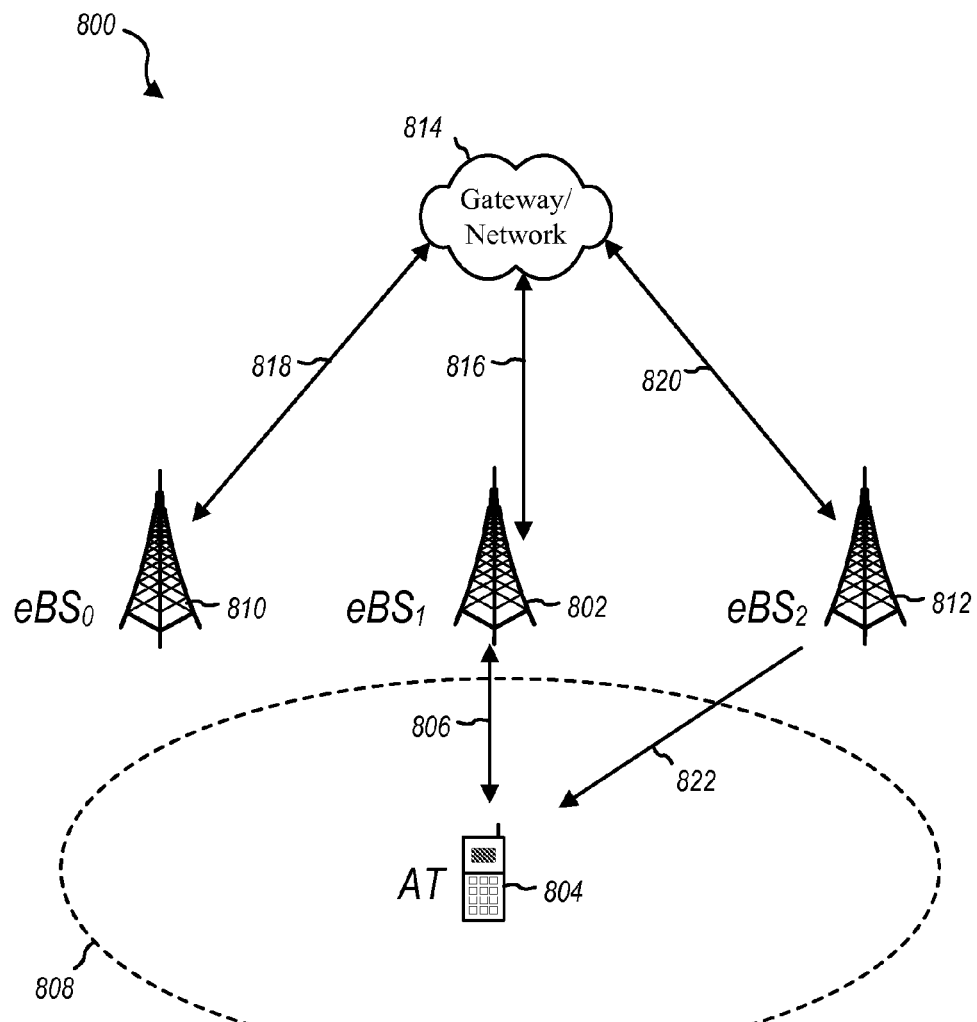
FIG. 8 is yet another example of a communication system utilizing further aspects of neighbor base station discovery.

FIG. 8 illustrates yet another example of a communication system 800 utilizing neighbor discovery. In the example of FIG. 8, a first base station eBS$_1$ 802 serves an AT 804 over a wireless link 806. An area 808 where the AT 804 may be presently located in this example is a coverage area where communication services (e.g., voice, paging, etc.) may be served by any one of one or more other neighboring base stations, such as eBS$_0$ 810 and eBS$_2$ 812. In the example of FIG. 8, it is assumed for illustration that eBS$_0$ 810 is a known neighbor to eBS$_1$ 802, and thus that eBS$_0$ 810 is part of the neighbor list for eBS$_1$. When a new base station, namely eBS$_2$ 812, is added to the neighbor list of base station eBS$_1$ 802 through the methodologies discussed previously, base station eBS$_1$ may be configured to, in turn, update neighboring base stations such as eBS$_0$ 810 which potentially serve the same coverage area 808. Accordingly, eBS$_1$ 802 would communicate the identification data concerning eBS$_2$ 812 received from eBS$_2$ via ND procedures. This communication may be effected via the gateway/network 814 and associated communications links 816 and 818. Accordingly, the new or updated neighbor list of eBS$_1$ 802 (which would include eBS$_0$ and eBS$_2$) is communicated to eBS$_0$ 810 to update its neighbor list. Similarly, eBS$_1$ could also communicate its updated neighbor list to newly discovered eBS$_2$ 812 via the gateway/network 814 and associated communications links 816 and 820.

It is noted that there may exist instances during ND procedures where the identification signal or network identification of a newly added base station conflicts with an existing neighboring base station's identification signal or network identification. In such cases, the base station performing ND procedures may be configured to mediate the conflict. Using system 800 in FIG. 8, for illustration purposes, if the AT 804 detects or receives a pilot signal 822 with a pilotID from new base station eBS$_2$ 812, using the previously described ND methods, the AT 804 will communicate the pilotID to the serving base station (i.e., eBS$_1$ 802). If the serving base station detects a conflict with an existing pilotID, such as the pilot ID of neighboring base station eBS$_0$ 810, for example, the serving base station eBS$_1$ 802 can initiate mediation. The mediation may consist of the serving base station communicating via gateway/network 814 to the neighboring base stations 810 and 812 to issue a request to at least one of base station 810 or 812 to change its respective pilotID. This mediation procedure may be implemented in any number of suitable manners know to those skilled in art. The mediation process may also involve initiating registration of the new base station 812 and communication of updated information to all base stations in its current neighbor list. Furthermore, the updated pilot ID information may be communicated to the AT 804 actively by the serving base station over the wireless link 806, or alternatively via continued detection or reception of the pilot signal 822 by the AT 804 in a somewhat more passive manner. It is noted that the mediation functionality may be implemented by the neighbor discovery function 414 disclosed in FIG. 4, as an example.

Figure 9:
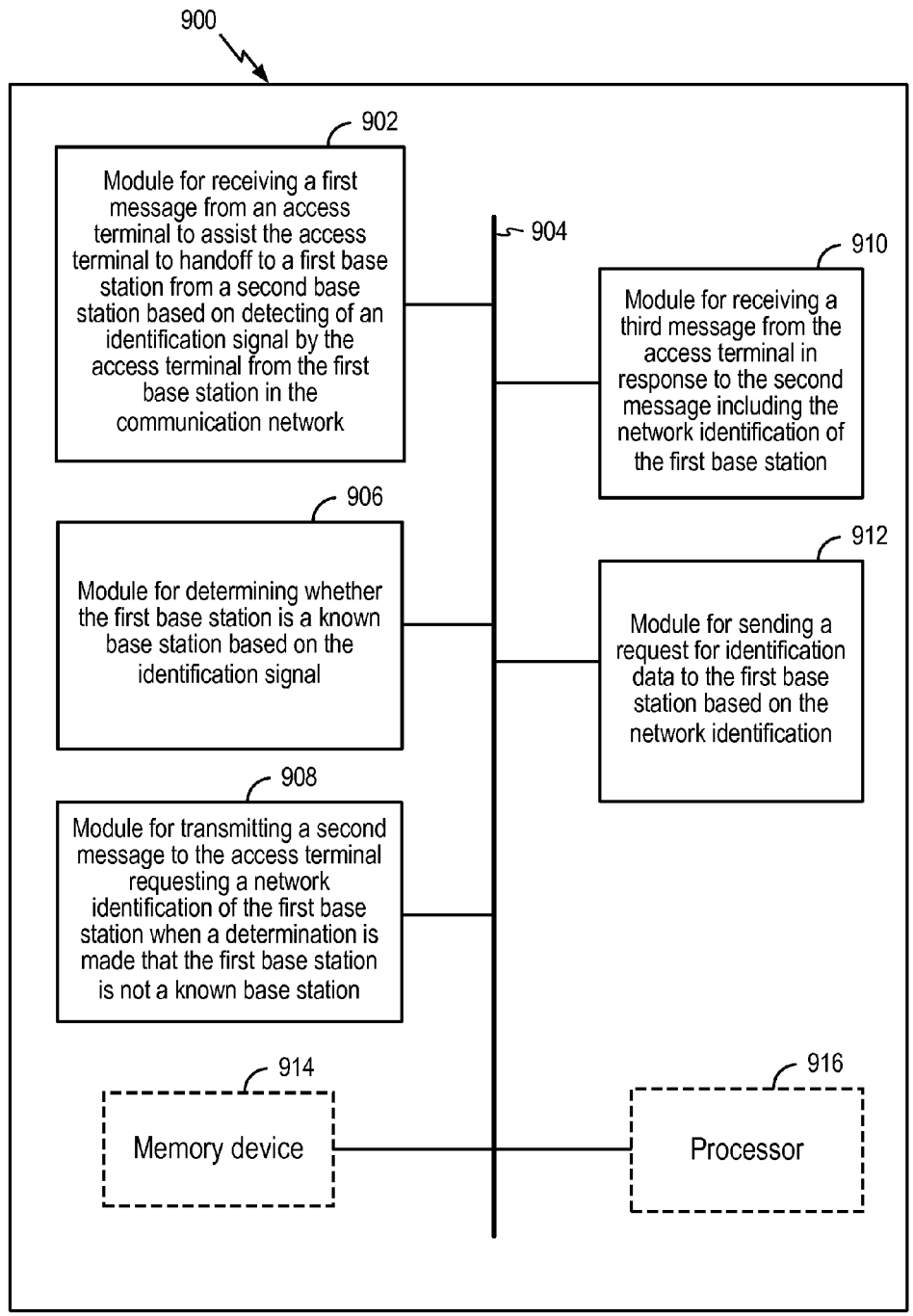
FIG. 9 is still another exemplary apparatus that may be utilized for neighbor discovery of base stations in a communication system.

FIG. 9 illustrates an apparatus 900 for use in a communication system that may be utilized for neighbor discovery of base stations. The apparatus 900, which may be implemented in a base station, for example, includes a module 902 for receiving a first message from an access terminal to assist the access terminal to handoff to a first base station from a second base station based on detecting of an identification signal by the access terminal from the first base station in the communication network. The information received by module 902 may then be communicated to various other modules in apparatus 900 via a bus 904, or similar suitable communication coupling. In particular, the first message and/or identification signal may be communicated to a module 906 for determining whether the first base station is a known base station based on the identification signal.

Apparatus 900 further includes a module 908 for transmitting a second message to the access terminal requesting a network identification of the first base station when a determination is made that the first base station is not a known base station, such as by module 906. Apparatus 900 also includes a module 910 for receiving a third message from the access terminal in response to the second message sent by module 908, for example, wherein the third message includes the network identification of the first base station. A module 912 is also featured for sending a request for identification data to the first base station based on the network identification received by module 910. In addition, the apparatus 900 may include an optional computer readable medium or memory device 914 configured to store computer readable instructions and data for effecting the processes and behavior of either the modules. Additionally, apparatus 900 may include a processor 916 to execute the computer readable instructions in memory 914, and may be configured to execute one or more functions of the various modules in apparatus 900.

Figure 10:
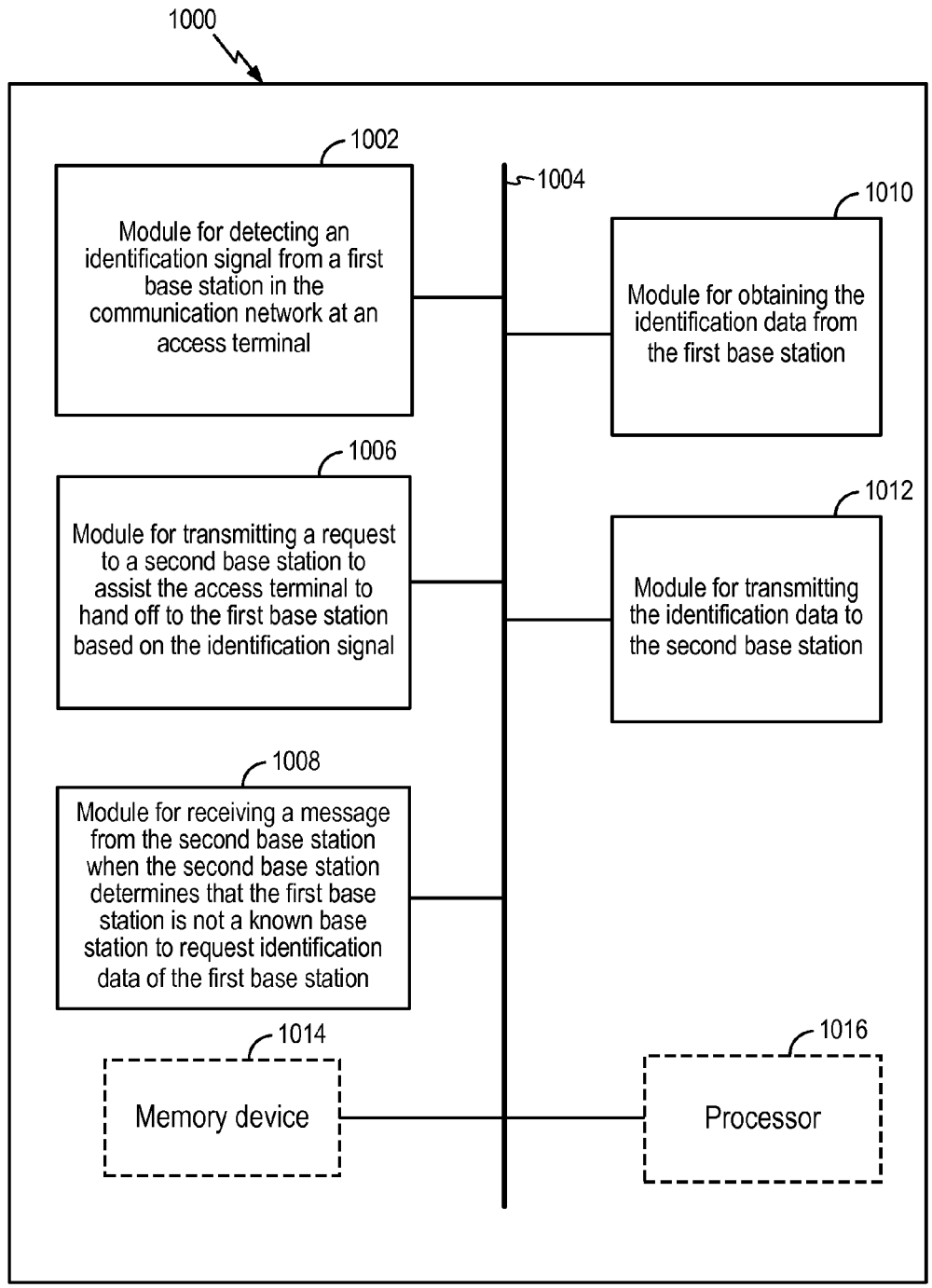
FIG. 10 is a further exemplary apparatus that may be utilized for neighbor discovery of base stations in a communication system.

FIG. 10 illustrates an apparatus 1000 for use in a communication system that may be utilized for neighbor discovery of base stations. The apparatus 1000, which may be implemented in an access terminal, for example, includes a module 1002 for detecting an identification signal from a first base station in the communication network at an access terminal. The information received by module 1002 may then be communicated to various other modules in apparatus 1000 via a bus 1004, or other similar suitable communication coupling. In particular, the identification signal may be communicated to a module 1006 for transmitting a request to a second base station to assist the access terminal to hand off to the first base station based on the identification signal.

Apparatus 1000 further includes a module 1008 for receiving a message from the second base station when the second base station determines that the first base station is not a known base station to request identification data of the first base station. A module 1010 is also included for obtaining the identification data from the first base station, as well as a module 1012 for then transmitting the identification data to the second base station. Also, the apparatus 1000 may include an optional computer readable medium or memory device 1014 configured to store computer readable instructions and data for effecting the processes and behavior of either the modules. Additionally, apparatus 1000 may include a processor 1016 to execute the computer readable instructions in memory 1014, and may be configured to execute one or more functions of the various modules in apparatus 1000.

In light of the above discussion, it can be appreciated that the presently disclosed methods and apparatus afford efficacious discovery of neighboring base stations added to a communication system with a minimal impact on wireless resources in the system. It will also be appreciated by those skilled in the art that the present methods and apparatus are also useful for updating neighbor lists when base stations are removed from the communication system.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, means, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claimed is:

1. A method of discovering a first base station by a second base station in a communication system comprising:
   receiving a first message, from an access terminal, to assist the access terminal to handoff from the second base station to the first base station, wherein the message is received based on detecting of an identification signal, by the access terminal, from the first base station in the communication system;
   determining whether the first base station is a known base station based on the identification signal;
   transmitting a second message, to the access terminal, requesting a network identification of the first base station when a determination is made that the first base station is not a known base station, wherein the network identification is derived from the identification signal;
   receiving a third message, from the access terminal, in response to the second message, wherein the third message includes the network identification of the first base station;
   sending a request for identification data, to the first base station, based on the network identification;
   receiving a reply, from the first base station, in response to the request for identification data, wherein the reply includes the identification data;
   registering, using at least a portion of the identification data, the first base station in a neighbor list of the second base station; and
   sending, via a network link, at least a portion of information in the neighbor list for use by at least a third base station in the communication system.

2. The method as defined in claim 1, wherein the network identification includes at least one of a sector ID or an ANID, and the identification data includes at least one of geographical location, paging related information, topological information, routing information, or a protocol interface version of the first base station.

3. The method as defined in claim 1, wherein the access terminal is integrated with the second base station.

4. The method as defined in claim 1, wherein the network link includes at least one of an access gateway or an IP network.

5. The method as defined in claim 1, wherein determining whether the first base station is a known base station based on the identification signal includes comparing at least a portion of the identification signal with a neighbor list of currently registered base stations known to the second base station.

6. The method as defined in claim 5, further comprising:
   mediating between the first base station and the third base station when a conflict between at least one of the identification data or network data of the first base station and corresponding at least one of identification data or network data of the third base station is detected by the second base station.

7. The method of claim 1, wherein the identification signal comprises a pilot identification (pilotID) of the first base station.

8. An apparatus for use in discovering a base station in a communication network comprising:
   a transceiver circuit configured to receive a first message, from an access terminal, to assist the access terminal to handoff to a first base station from a second base station, wherein receipt of the first message is based on detecting of an identification signal, by the access terminal, from the first base station in the communication system;
   a neighbor discovery module stored on a memory unit, wherein the neighbor discovery module is configured to determine whether the first base station is a known base station based on the identification signal when executed by a processor;
   wherein the transceiver circuit is further configured to:
   transmit a second message to the access terminal, requesting a network identification of the first base station when a determination is made by the neighbor discovery module that the first base station is not a known base station, and
   receive a third message, from the access terminal, in response to the second message, wherein the third message includes the network identification of the first base station, wherein the network identification is derived from the identification signal;
   a network interface circuit configured to:
   send, via a network link, a request for identification data, to the first base station, based on the network identification; and
   receive a reply, from the first base station, in response to the request for identification data, wherein the reply includes the identification data; and
   wherein the neighbor discover module is further configured to:
   register, using at least a portion of the identification data, the first base station in a neighbor list of the second base station, and
   send, via the network link, at least a portion of information in the neighbor list for use by at least a third base station in the communication system.

9. The apparatus as defined in claim 8, wherein the network identification includes at least one of a sector ID or an ANID, and the identification data includes at least one of geographical location, paging related information, topological information, routing information, or a protocol interface version of the first base station.

10. The apparatus as defined in claim 8, wherein the access terminal is integrated with the second base station.

11. The apparatus as defined in claim 8, wherein the network link includes at least one of an access gateway or an IP network.

12. The apparatus as defined in claim 8, wherein the neighbor discovery module is further configured to determine whether the first base station is a known base station based on the identification signal by comparing at least a portion of the identification signal with a neighbor list of currently registered base stations known to the second base station.

13. The apparatus as defined in claim 12, wherein the neighbor discovery module is further configured to mediate between the first base station and the third base station when a conflict between at least one of the identification data or network data of the first base station and corresponding at least one of identification data or network data of the neighboring base station is detected by the second base station.

14. An apparatus for use in a communication system comprising:
 means for receiving a first message, from an access terminal, to assist the access terminal to handoff to a first base station from a second base station, wherein the receiving is based on detecting of an identification signal, by the access terminal, from the first base station in the communication network;
 means for determining whether the first base station is a known base station based on the identification signal;
 means for transmitting a second message, to the access terminal, requesting a network identification of the first base station when a determination is made that the first base station is not a known base station, wherein the network identification is derived from the identification signal;
 means for receiving a third message, from the access terminal, in response to the second message, wherein the third message includes the network identification of the first base station;
 means for sending a request for identification data, to the first base station, based on the network identification;
 means for receiving a reply, from the first base station, in response to the request for identification data, wherein the reply includes the identification data;
 means for registering, using at least a portion of the identification data, the first base station in a neighbor list of the second base station; and
 means for sending, via a network link, at least a portion of information in the neighbor list for use by at least a third base station in the communication system.

15. The apparatus as defined in claim 14, wherein the network identification includes at least one of a sector ID or an ANID, and the identification data includes at least one of geographical location, paging related information, topological information, routing information, or a protocol interface version of the first base station.

16. The apparatus as defined in claim 14, wherein the access terminal is integrated with the second base station.

17. The apparatus as defined in claim 14, wherein the network link includes at least one of an access gateway or an IP network.

18. The apparatus as defined in claim 14, wherein the means for determining whether the first base station is a known base station based on the identification signal includes means for comparing at least a portion of the identification signal with a neighbor list of currently registered base stations known to the second base station.

19. The apparatus as defined in claim 18, further comprising:
 means for mediating between the first base station and the third base station when a conflict between at least one of the identification data or network data of the first base station and corresponding at least one of identification data or network data of the third base station is detected by the second base station.

20. A non-transitory computer-readable medium comprising:
 code for causing a computer to receive a first message, from an access terminal, to assist the access terminal to handoff to a first base station from a second base station, wherein receipt of the first message is based on detecting of an identification signal, by the access terminal, from the first base station in the communication system;
 code for causing a computer to determine whether the first base station is a known base station based on the identification signal;
 code for causing a computer to transmit a second message, to the access terminal, requesting a network identification of the first base station when a determination is made that the first base station is not a known base station, wherein the network identification is derived from the identification signal;
 code for causing a computer to receive a third message, from the access terminal, in response to the second message, wherein the third message includes the network identification of the first base station;
 code for causing a computer to send a request for identification data, to the first base station, based on the network identification;
 code for causing a computer to receive a reply, from the first base station, in response to the request for identification data, wherein the reply includes the identification data;
 code for causing a computer to register, using at least a portion of the identification data, the first base station in a neighbor list of the second base station; and
 code for causing a computer to send, via a network link, at least a portion of information in the neighbor list for use by at least a third base station in the communication system.

21. The non-transitory computer-readable medium as defined in claim 20, wherein the network identification includes at least one of a sector ID or an ANID, and the identification data includes at least one of geographical location, paging related information, topological information, routing information, or a protocol interface version of the first base station.

22. The non-transitory computer-readable medium as defined in claim 20, wherein the access terminal is integrated with the second base station.

23. The non-transitory computer-readable medium as defined in claim 20, wherein the network link includes at least one of an access gateway or an IP network.

24. The non-transitory computer-readable medium as defined in claim 20, wherein the code for causing a computer to determine whether the first base station is a known base station based on the identification signal further comprises code for causing a computer to compare at least a portion of the identification signal with a neighbor list of currently registered base stations known to the second base station.

25. The non-transitory computer-readable medium as defined in claim 24, the computer-readable medium further comprising:
  code for causing a computer to mediate between the first base station and the third base station when a conflict between at least one of the identification data or network data of the first base station and corresponding at least one of identification data or network data of the third base station is detected by the second base station.

26. A method of discovering a base station in a communication system, the method comprising:
  detecting, at an access terminal, an identification signal from a first base station in the communication network;
  transmitting a request, based on the identification signal, to a second base station to assist the access terminal to hand off to the first base station;
  receiving a message, from the second base station, when the second base station determines that the first base station is not a known base station, wherein the message requests network identification of the first base station;
  deriving the network identification of the first base station from the detected identification signal;
  transmitting the network identification to the second base station; and
  receiving at least one of updated identification signal information or updated network identification from at least one of the first base station or a third base station, wherein the receiving is based on a mediation between the first base station and the third base station, by the second base station, when a conflict between at least one of the identification signal or network identification of the first base station and corresponding at least one of identification signal or network identification of the third base station is detected by the second base station.

27. The apparatus as defined in claim 26, wherein the network identification includes at least one of a sector ID or an ANID.

28. The method as defined in claim 26, wherein the access terminal is integrated with the second base station.

29. The method as defined in claim 26, wherein the second base station determines whether the first base station is not a known base station based on the identification signal by comparing at least a portion of the identification signal with a neighbor list of currently registered base stations known to the second base station.

30. The method of claim 26, wherein the identification signal comprises a pilot identification (pilotID) of the first base station.

31. An apparatus in an access terminal for use in neighbor discovery of a base station in a communication system, the apparatus comprising:
  a transceiver circuit, at the access terminal, configured to:
    detect an identification signal from a first base station in the communication network,
    transmit a request, based on the identification signal, to a second base station to assist the access terminal to hand off to the first base station, and
    receive a message, from the second base station, when the second base station determines that the first base station is not a known base station, wherein the message requests network identification of the first base station; and
  a neighbor discovery module stored on a memory unit, wherein the neighbor discovery module is configured to derive the network identification of the first base station from the detected identification signal and direct the transceiver circuit to transmit the network identification to the second base station when executed by a processor,
  wherein the transceiver circuit and neighbor discovery module are further configured to receive at least one of updated identification signal information or updated network identification from at least one of the first base station or a third base station, wherein the reception is based on a mediation between the first base station and the third base station, by the second base station, when a conflict between at least one of the identification signal or network identification of the first base station and corresponding at least one of identification signal or network identification of the third base station is detected by the second base station.

32. The apparatus as defined in claim 31, wherein the identification network includes at least one of a sector ID or an ANID.

33. The apparatus as defined in claim 31, wherein the access terminal is integrated with the second base station.

34. The apparatus as defined in claim 31, wherein the second base station determines whether the first base station is a known base station based on the identification signal by comparing at least a portion of the identification signal with a neighbor list of currently registered base stations known to the second base station.

35. An apparatus in an access terminal for use in neighbor discovery of a base station in a communication system, the apparatus comprising:
  means for detecting, at the access terminal, an identification signal from a first base station in the communication network;
  means for transmitting a request, based on the identification signal, to a second base station to assist the access terminal to hand off to the first base station;
  means for receiving a message from the second base station when the second base station determines that the first base station is not a known base station, wherein the message requests network identification of the first base station;
  means for deriving the network identification of the first base station from the detected identification signal;
  means for transmitting the network identification to the second base station; and
  means for receiving at least one of updated identification signal information or updated network identification from at least one of the first base station or a third base station, wherein the receiving is based on a mediation between the first base station and the third base station, by the second base station, when a conflict between at least one of the identification signal or network identification of the first base station and corresponding at least one of identification signal or network identification of the third base station is detected by the second base station.

36. The computer program product as defined in claim 35, wherein the network identification includes at least one of a sector ID or an ANID.

37. The computer program product as defined in claim 35, wherein the access terminal is integrated with the second base station.

38. The computer program product as defined in claim 35, wherein the second base station determines whether the first base station is a known base station based on the identification signal by comparing at least a portion of the identification signal with a neighbor list of currently registered base stations known to the second base station.

39. A non-transitory computer-readable medium comprising:
- code for causing a computer to detect, at an access terminal, an identification signal from a first base station in the communication network;
- code for causing a computer to transmit a request, based on the identification signal, to a second base station to assist the access terminal to hand off to the first base station;
- code for causing a computer to receive a message from the second base station when the second base station determines that the first base station is not a known base station, wherein the message requests network identification of the first base station;
- code for causing a computer to derive the network identification of the first base station from the detected identification signal;
- code for causing a computer to transmit the network identification to the second base station; and
- code for receiving at least one of updated identification signal information or updated network identification from at least one of the first base station or a third base station, the receiving based on a mediation between the first base station and the third base station, by the second base station, when a conflict between at least one of the identification signal or network identification of the first base station and corresponding at least one of identification signal or network identification of the third base station is detected by the second base station.

40. The non-transitory computer-readable medium as defined in claim 39, wherein the network identification includes at least one of a sector ID or an ANID.

41. The non-transitory computer-readable medium as defined in claim 39, wherein the access terminal is integrated with the second base station.

42. The non-transitory computer-readable medium as defined in claim 39, wherein the second base station determines whether the first base station is a known base station based on the identification signal by comparing at least a portion of the identification signal with a neighbor list of currently registered base stations known to the second base station.

* * * * *